April 3, 1928.

A. VASZIN

VEHICLE

Filed Oct. 31, 1925

Inventor
Aurel Vaszin

By Toulmin & Toulmin,
Attorneys

April 3, 1928. 1,664,437
A. VASZIN
VEHICLE
Filed Oct. 31, 1925 3 Sheets-Sheet 2

Inventor
Aurel Vaszin
By Toulmin & Toulmin,
Attorneys

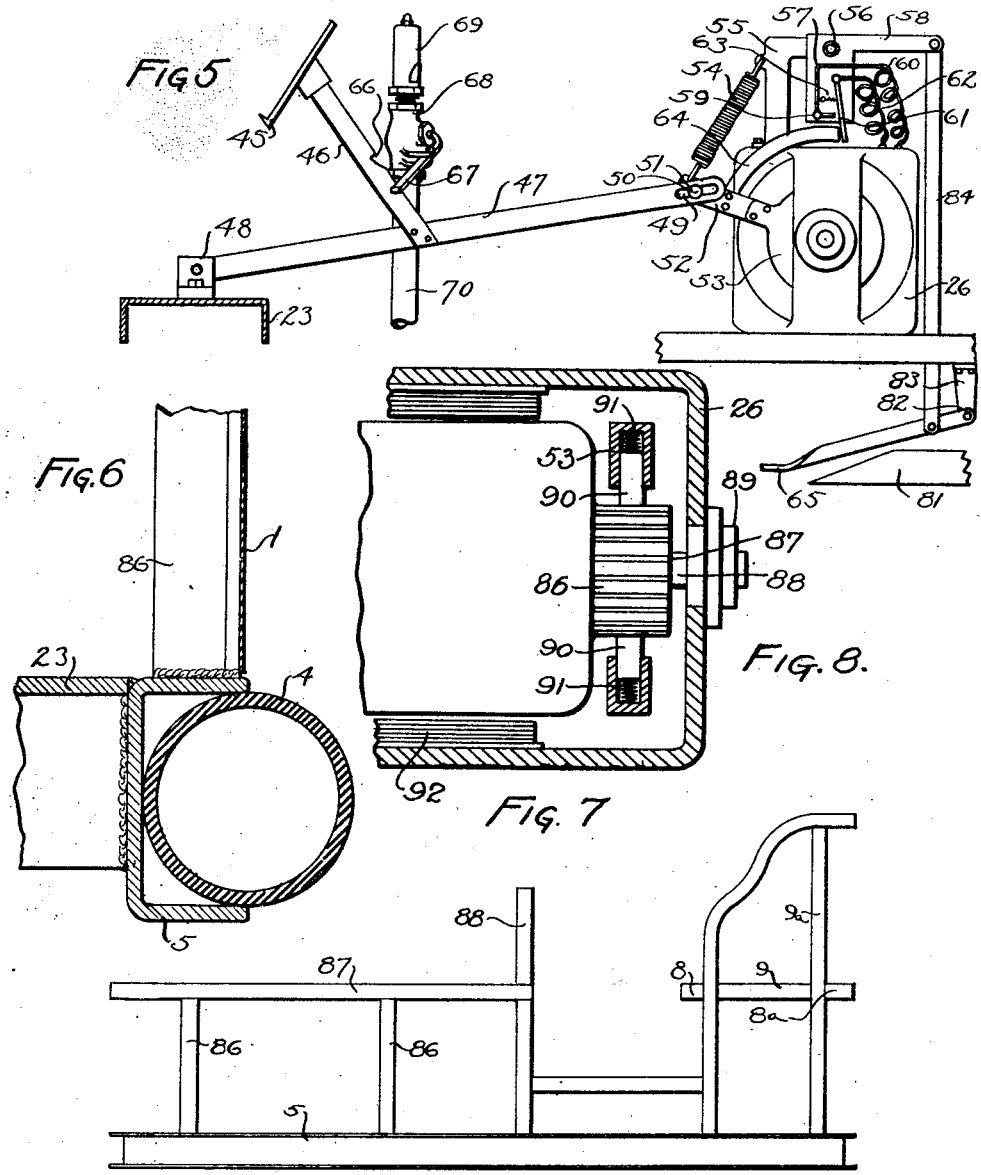

Patented Apr. 3, 1928.

1,664,437

UNITED STATES PATENT OFFICE.

AUREL VASZIN, OF DAYTON, OHIO.

VEHICLE.

Application filed October 31, 1925. Serial No. 65,951.

My invention relates to vehicles and in particular to vehicles for pleasure parks.

It is the object of my invention to provide a vehicle with an erratic steering apparatus for use in pavilions and pleasure parks, so arranged that it will not turn over, that it cannot be steered with any certainty of securing a desired direction of steering and so arranged that its contact with other similar vehicles or the side walls of the pavilion will not injure the vehicle or its occupants, but, in fact, will cause the one to bounce off of the other.

It is a further object to provide a control over the power supplied to the vehicle, which is also of such unexpected character that, by a continuous movement of the power control, the vehicle will be stopped and started forwardly; stopped and started rearwardly.

It is a further object to provide a connection to the same power control means which will blow a whistle at a predetermined interval.

It is my object to provide a whistle supplied with air by an air compressor, the air storage chamber being located within a resilient buffer member which surrounds the vehicle and serves as a storage chamber for the air.

It is a further object to provide, in combination with cars of this character, a pavilion having various devices for suddenly moving the vehicle in unexpected directions, and a tunnel communicating with the pavilion having permanent tracks so that if the operator of the vehicle is able to get within the tunnel on the tracks, the vehicle will travel through the tunnel and out again into the pavilion. This enables the operator with his companion to have the pleasure of riding through the dark tunnel.

It is my object to provide a device for maintaining the power on the vehicle during the passage through the tunnel so that the operator cannot stop the vehicle in the tunnel.

Referring to the drawings:

Figure 5 is a diagrammatic view showing the whistle switch, the foot control lever for the power and the track operated switch;

Figure 6 is a section on the line 6—6 of Figure 3, showing the channel support before the combined buffer and air tank;

Figure 7 is an elevation of the frame work of the vehicle without the covering.

Figure 8 is a fragmentary view of the motor showing the reversing mechanism.

Figure 1:
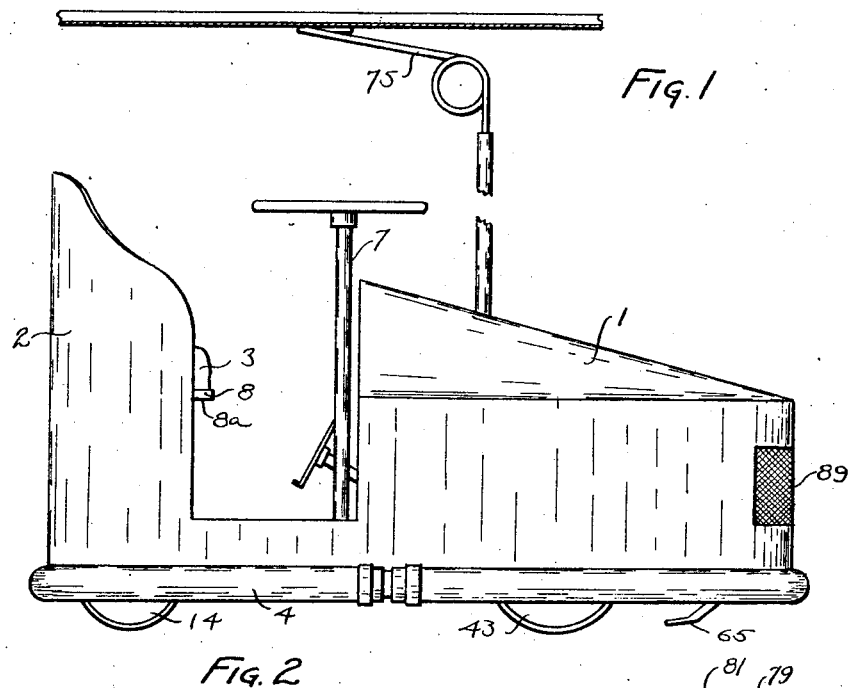
Figure 1 is a side elevation of the vehicle.

Referring to the drawings in detail, 1 is the hood of a vehicle and 2 is the body portion containing the seat 3. Surrounding the vehicle is a continuous rubber tube 4 which is mounted within a marginal channel iron 5 to which marginal channel iron are welded various cross members and supports. For instance, cross member 6 is used to provide the bearing support for the steering column 7. A second tranverse member 8 acts as a support for the seat while diagonal supports 9 and 10 proceed from the transverse brace 8 to the rear wall 2 of the seat where they are joined to vertical brace members for the seat, $9^a$ and $10^a$. The seat rests upon the circular support $8^a$.

The channel iron 5 carries the brackets 11 and 12 which support the spindles 13 of the steering wheels 14. To these spindles are connected drag links 15 which are in turn connected together by a ball and socket joint 16 to a connecting link 17. To this connecting link 17 is connected at one end, by a ball and socket joint 18, a steering link 19 which is connected at its other end by a ball and socket joint to an arm 21. This steering arm 21 or steering crank is mounted on the steering column 7 which is operated by the steering wheel 22. The side frame or channel member is further connected by a cross member 23. This cross member carries two spaced, parallel, forwardly directed channel irons 24 and 25. On these channel irons, which are connected at the forward ends to the channel 5, is mounted the driving motor 26. The armature shaft of this motor carries a sprocket wheel 27 and a chain 28. It also carries a sprocket 29 and a chain 30. The last mentioned chain is mounted on the sprocket 31 carried on the shaft 32 of the air compressor 33. The other chain 28 is carried on the sprocket 34 on the shaft 35 journaled in the side frame 5 and suitable brackets 36. This serves to operate the shaft 35 which in turn operates a sprocket 37 mounted thereon. A chain 38 is mounted on the sprocket operating a sprocket 39 carried on the driving wheel shaft 40. This driving wheel shaft 40 carries three forward driving wheels 41, 42 and 43. The shaft itself is journaled in sockets 44 carried by the side frame 5.

The motor is controlled by a movement of the brushes which either cause the motor to turn in one direction or the other, according to their position, in the customary manner. The same means for controlling the brushes also controls the application of the current.

For this purpose, there is provided a foot pedal 45 mounted on a foot pedal support 46 which in turn is mounted upon a lever 47 pivoted at one end at 48 on the transverse member 23 and connected at its other end by a slot 49 in which works a pin 50 with a brush lever 52 which carries a suitable ring 53 for rotating the brushes on the armature. This lever and foot pedal are normally held in their uppermost position by the helical spring 54 connected at one end of the lever 52 and at the other end to a bracket 55 mounted on the motor. This bracket 55 carries pivotally at 56 an L-shaped support for the switch members, consisting of a depending member 57 and a laterally extending arm 58. On the depending plate 57 is mounted the stationary contact member 59 connected to a wire 60 which leads to the motor. A second contact of a movable character 61 is connected to the motor by the wire 62. It is normally impelled towards the stationary contact by the helical spring 63 connected thereto. This union of the movable and stationary contacts cannot be effected, however, by reason of the fact that an arcuate controlling arm 64 is carried by the brush lever 52 and has its free end engaging with the movable contact member 61 to prevent it from the contact so long as the foot pedal is in its uppermost position, except in the condition to be hereinafter explained, when the track pedal 65 has been operated.

Thus, when the foot pedal is depressed, the motor will be started forward due to the fact that the contacts are allowed to close and the brushes are in position for the motor to drive the vehicle in a forwardly direction, but with a continued downward pressure of the pedal, the direction of the brushes will be shifted and the direction of the motor will be reversed so that the direction of the vehicle will also be reversed. There is a notch 66 provided on the pedal support 46 which engages with a lever 67 which controls the valve 68 which permits air to be applied to the whistle 69 so that the whistle will be blown when the direction of the vehicle is changed. Air is supplied to this valve by the pipe 70 which leads from the air compressor 33. This pipe is also provided with another branch 71 which leads at 72 into the rubber hose 4 which constitutes an air reservoir and a buffer.

It will be understood that a suitable safety valve 73 is provided in the air line. Thus, the vehicle will be steered by the continuous rotation in either direction of the steering wheel which will bring about an erratic and unexpected movement of the vehicle which cannot be determined. The manipulation of the foot pedal 45 will control the application of power, and direction of movement, as well as the blowing of the whistle.

The vehicle is very close to the ground so that it will not turn over, and due to its extremely rigid construction, it cannot be injured nor can the passengers be injured.

Figure 2:
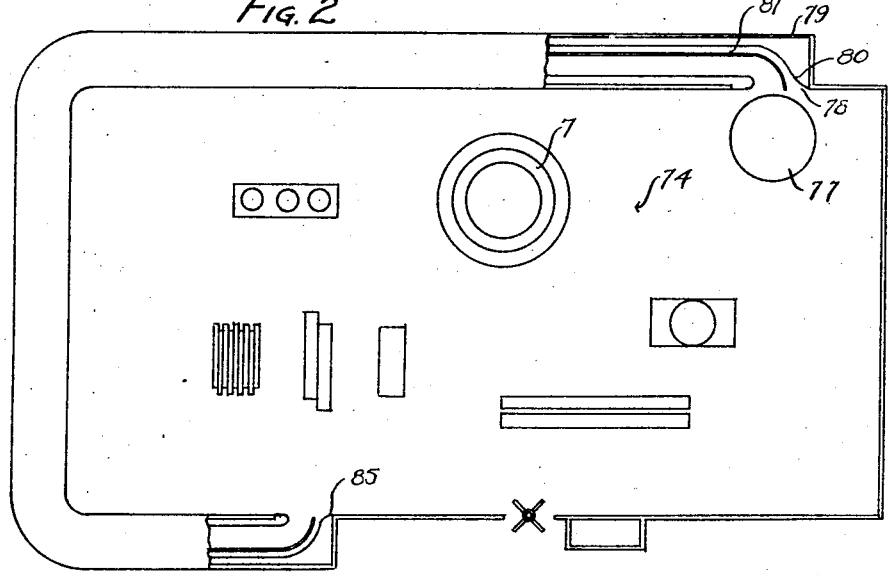
Figure 2 is a plan view with the top of the tunnel broken away partially and the top of the pavilion broken away showing the pavilion and the tunnel.
Figure 3:
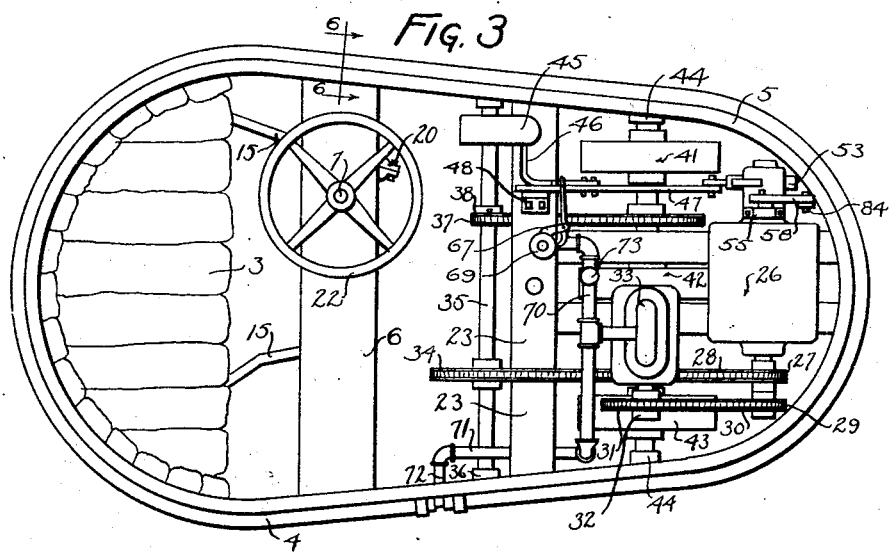
Figure 3 is a plan view of the vehicle with the hood removed.
Figure 4:
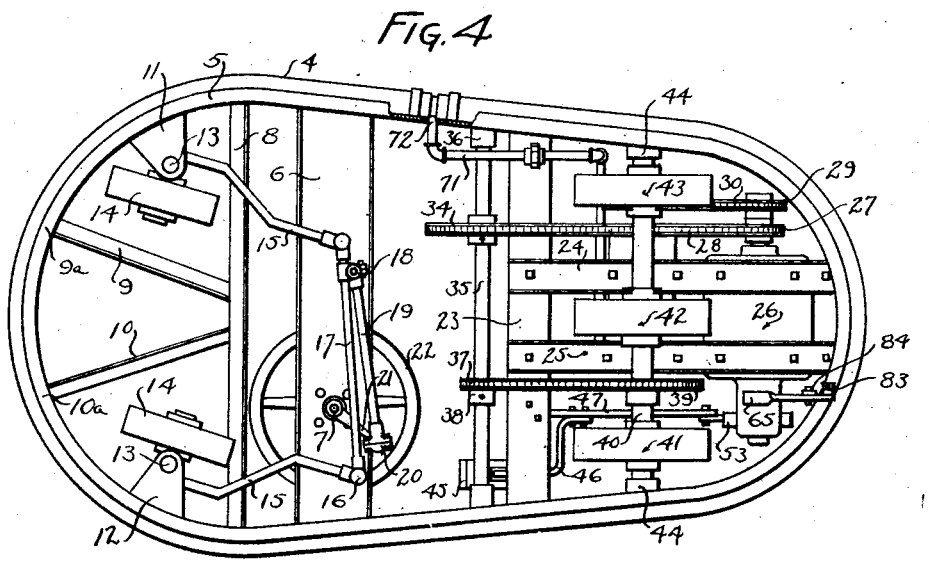
Figure 4 is a bottom plan view of the vehicle.

Turning to Figure 2, 74 is a floor of a pavilion, preferably of metal. It forms part of the circuit for the current which is supplied through the trolley 75. The trolley runs on a wire netting or metallic member which forms the roof of the pavilion. The floor is provided with a number of revolving or agitated members, customary in such a pavilion, such as 76, 77 and the like. At one side of the pavilion is an opening 78 leading into a tunnel 79. At the mouth of this tunnel, the tracks 80 are flared to facilitate the entrance of the wheels of the vehicle between the tracks. When the vehicle is once within the tracks, it is steered by the tracks so that it will not have its erratic course, due to hand steering, and will, therefore, pass through the tunnel. To insure its passing through the tunnel I provide a supplementary rest track member, designated 81, which engages with the track pedal 65 moving it about its pivotal connection on the depending bracket 83 beneath the frame of the vehicle. A link 84 is pivoted on this track pedal at one end and to the laterally extending arm 58 at the other, so that when the track pedal is elevated, due to the entrance of the vehicle into the tunnel, the stationary contact is brought into engagement with the movable contact, even though the pedal is up, thus insuring the application of the power continuously to the vehicle to move it through the tunnel. The vehicle makes its exit through the tunnel at the opening 85.

The reversing means for the motor is shown in Figure 8. It will be seen from this figure that the motor carries the commutator 86 provided with grooves 87, the shaft 88 operating in a bearing 89 in the motor casing. Engaging the commutator 86 are the brushes 90, carried by the ring 53 and being spaced from the said ring by the springs 91. The poles are illustrated at 92. In order to reverse the direction of the motor, the brushes simply move the commutator to the desired groove, and the reversal of the motor is thereby effected. These features are of standard construction.

It will be understood that it is very difficult to get the vehicle into the tunnel, due to its erratic steering, and due to the fact that the disk 77 is rapidly revolving while the rest of the floor of the pavilion 74 is stationary. The reward for the successful entrance into the tunnel is the pleasure of the occupants being allowed to pass through the darkened tunnel together and the additional ride on the pavilion.

According to the system I employ, the operating part of the vehicle beneath the hood 1 is protected by a frame work consisting of vertical members 86 and a circular top member 87, and an arch support 88 at the rear of the hood. A grille 89 is provided in the front of the vehicle for the passage of air to cool the motor.

It will be understood that I desire to comprehend within my invention such modifications as may be necessary to adapt it to varying conditions and uses.

Having thus fully described my invention, what I claim as new and desire to secure by Letters Patent, is:

1. In a vehicle, a driving motor supplied with current, driving means for the vehicle driven by said motor, a switch for said motor, means to reverse the direction of said motor, a common means for operating said switch and said reverse means, adapted to be operated by the operator, and a floor operated member adapted to operate said switch independently, and means on the floor for operating said switch.

2. In a vehicle, a driving motor, wheels driven thereby, means to control the operation of said motor by the operator, an air compressor driven by said motor connected to a whistle, and means connected to said whistle adapted to be engaged by said motor controlling means to operate the whistle at a predetermined interval.

3. In a vehicle, a driving motor, wheels driven thereby, means to control the operation of said motor by the operator, an air compressor driven by said motor connected to a whistle, and means connected to said whistle adapted to be engaged by said motor controlling means to operate the whistle at a predetermined interval, and a storage tank for said compressor and whistle consisting of an annular resilient buffer member mounted on said vehicle.

4. In a vehicle for use in amusement parks for erratic movements, a frame consisting of an annular channel member, forward frame members for supporting driving mechanism, rear frame members for supporting eccentric steering mechanism, erratic steering mechanism and driving mechanism, said frame having a continuous annular external member, a resilient pneumatic tube mounted in said annular member to act as a buffer and as a storage tank for air for a whistle, a whistle and an air compressor connected to said whistle and said storage tank operated by said source of power for driving the vehicle.

5. In a vehicle for use in amusement parks for erratic movements, a frame consisting of an annular channel member, forward frame members for supporting driving mechanism, rear frame members for supporting eccentric steering mechanism, erratic steering mechanism and driving mechanism, said frame having a continuous annular external member, a resilient pneumatic tube mounted in said annular member to act as a buffer and as a storage tank for air for a whistle, a whistle and an air compressor connected to said whistle and said storage tank operated by said source of power for driving the vehicle, a motor, a switch for said motor, and foot operative means for controlling said switch and reversing the direction of operation of said motor, said foot operated means being also adapted to operate said whistle, all of said operations being effected by one continuous movement of said foot means.

6. In a vehicle, a frame, an elevated seat mounted on said frame at one end, castor wheels for said frame, a rotatable steering means for said castor wheels, driving wheels for said vehicle, a driving motor for propelling said driving wheels, a trolley adapted to convey current to said motor, a ceiling adapted to engage said trolley for supplying said current, a floor adapted to complete the circuit in engagement with the driving wheels, and common foot operated means for controlling the application of power to said motor and reversing the direction of operation of said motor, said operations being performed by the continuous movement of said foot operated means in one direction.

7. In a vehicle, a frame, a pneumatic buffer, an elevated seat mounted on said frame at one end, eccentric steering wheels, steering means for said steering wheels, driving wheels, means for actuating said driving wheels, a trolley adapted to convey current to said driving means, a ceiling adapted to engage with said control for supplying current, a floor adapted to complete the circuit in engagement with the driving wheels, foot operated means for controlling the application of power to the driving means, and the reversal of direction of the driving means, a whistle, and means connected with the driving means for supplying air to the pneumatic buffer and to the whistle operated by said foot operated means.

8. In a control for a vehicle, a brush-setting lever, a switch-setting lever, a foot-operated lever adapted to operate said levers, a motor, yielding means to normally maintain said levers in inoperative position, a switch plate carrying a stationary contact and a movable contact, a rotating ring on said brush-setting lever, a track pedal and means connecting said track pedal to said switch plate, whereby when the foot-operated pedal is depressed the movable contact will be allowed to engage with the stationary contact and upon the further depression of the foot pedal the brush rotating ring will be moved and cause a change in the direction of movement of the motor, but if the direction pedal is independently operated the switch plate will be moved to move the stationary contact into engagement with the movable contact.

9. In a vehicle control, a switch, a stationary contact thereon, a movable contact thereon, yielding means to move said movable contact into engagement with the stationary contact, means to normally maintain said movable contact out of engagement with said stationary contact, foot operated means to permit said contacts to close, and track operated means adapted to move said switch plate so that the stationary contact will engage the movable contact if the foot operated means is in its inoperated position.

10. In a vehicle control, a switch, a stationary contact thereon, a movable contact thereon, yielding means to move said movable contact into engagement with the stationary contact, means to normally maintain said movable contact out of engagement with said stationary contact, foot operated means to permit said contacts to close, and track operated means adapted to move said switch plate so that the stationary contact will engage the movable contact if the foot operated means is in its inoperative position, a reversible electric motor, and means to control the direction of movement of said motor connected to and operated by said foot operated means, but not connected to said track operating means so that it will not be affected by the operation thereof.

11. In a vehicle, means to steer the vehicle comprising castor wheels and a rotating steering control, a reversible electric motor for propelling the vehicle, a trolley adapted to convey current to said motor, a ceiling adapted to engage with the trolley for supplying current, driving wheels for the vehicle, a floor adapted to complete the circuit through engagement with the driving wheels, and a common foot operated means for controlling the application of power to said motor and for reversing the movement of said motor.

12. In a vehicle for use in amusement parks, a body, supporting non-steerable driving wheels, a rotating castor, steerable wheels, links connecting said steerable wheels to one another, a crank eccentrically connected to said links, and a steering wheel connected to said crank adapted to rotate continuously in either direction.

13. In a vehicle for use in amusement parks, a platform, non-steerable driving wheels therefor, a steerable castor, wheels supporting the platform, arms extending from said castor wheels to steer them, a link connecting said arms, a drag link pivotally connected to said connecting link at a point closer to one arm than to the other, a crank located closer to one castor wheel than the other connected to said drag link, and a continuously rotating steering wheel connected to said crank.

In testimony whereof, I affix my signature.

AUREL VASZIN.